C. EBERHART, Jr.
INDICATOR OPERATING DEVICE FOR GASOLENE TANKS.
APPLICATION FILED MAY 20, 1913.
1,133,013.
Patented Mar. 23, 1915.
2 SHEETS—SHEET 1.
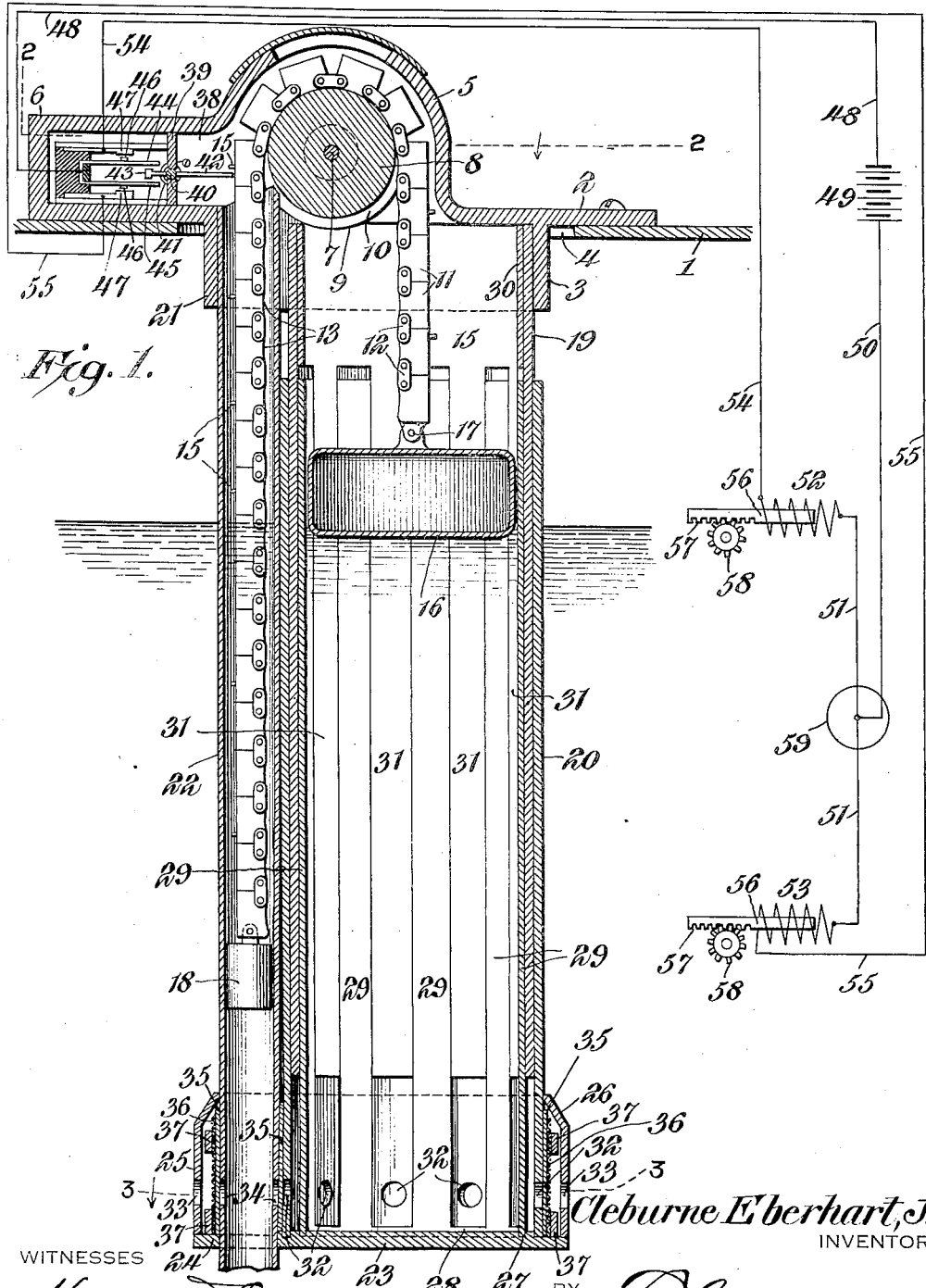
Cleburne Eberhart, Jr.,
INVENTOR,
WITNESSES
Howard D. Orr
F. T. Chapman
BY
E. G. Siggers
ATTORNEY C. EBERHART, Jr.
INDICATOR OPERATING DEVICE FOR GASOLENE TANKS.
APPLICATION FILED MAY 20, 1913.
1,133,013.
Patented Mar. 23, 1915.
2 SHEETS—SHEET 2.
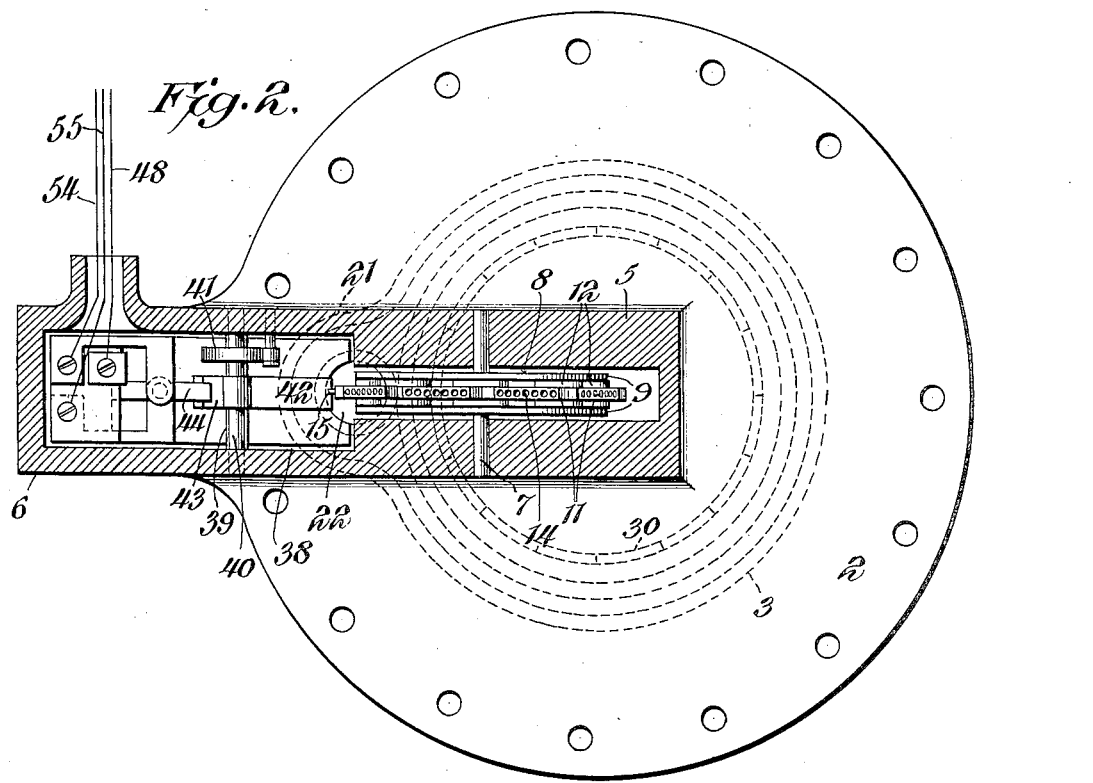
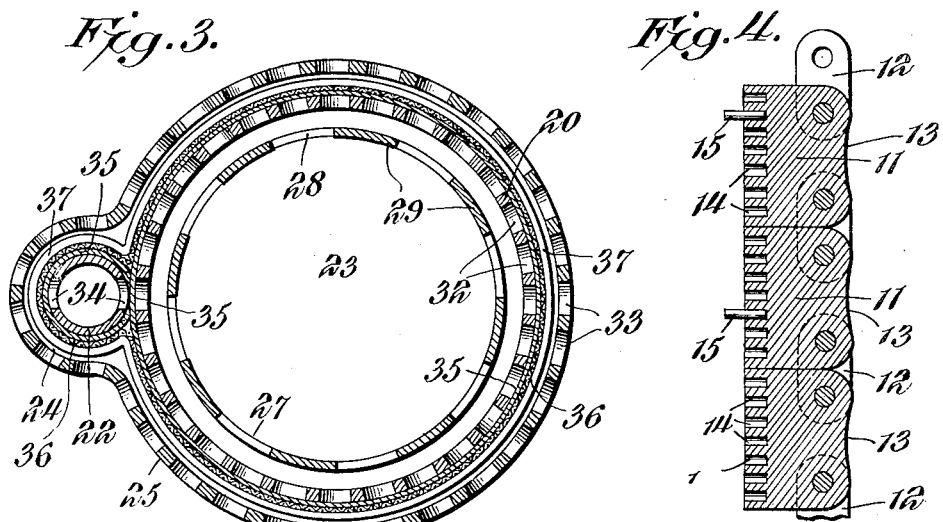
WITNESSES
Howard D. Orr.
F. T. Chapman.
Cleburne Eberhart, Jr., INVENTOR,
BY E. G. Siggers
ATTORNEY

UNITED STATES PATENT OFFICE.

CLEBURNE EBERHART, JR., OF ATLANTA, GEORGIA.

INDICATOR-OPERATING DEVICE FOR GASOLENE-TANKS.

1,133,013. Specification of Letters Patent. Patented Mar. 23, 1915.

Application filed May 20, 1913. Serial No. 768,882.

*To all whom it may concern:*

Be it known that I, CLEBURNE EBERHART, Jr., a citizen of the United States, residing at Atlanta, in the county of Fulton and State of Georgia, have invented a new and useful Indicator-Operating Device for Gasolene-Tanks, of which the following is a specification.

This invention has reference to improvements in indicator operating devices for gasolene tanks, although applicable to other liquids than gasolene, and its object is to provide a device which will cause the operation of an indicator showing the amount of gasolene in the tank at any time.

The invention is designed primarily for use in the gasolene tanks of automobiles, and throughout the following description it will be considered as so used, but it is to be understood that the invention is not confined in its adaptability to gasolene tanks, but may be used wherever it is desirable to show either high and low levels or intermediate levels of liquid within a receptacle.
The gasolene or fuel tanks of automobiles are of various shapes, and are oftentimes cylindrical or oval and mounted on the vehicle with their longitudinal central axis horizontal, so that different depths of gasolene in the tank do not represent a regularly increasing or decreasing amount of gasolene.

In accordance with the present invention a float is employed to rise and fall with the rising and falling of the level of the gasolene within the tanks, and this float is contained within a guideway constructed for elongation or shortening to conform to different depths of gasolene tanks, thus permitting the manufacture of the device from a single set of dies and the adaptation of the device to tanks of varying capacities. This is accomplished by making the guiding member telescoping, while there is provision for maintaining the interior of the guiding member of even internal diameter throughout despite the elongation of the telescoping members when the device is applied to a tank of greater depth than the predetermined minimum. The float is carried by a flexible member which for convenience may be termed a chain without being limited in construction to the specific meaning of the word, and this chain is arranged in such relation to an electric circuit controlling device that the circuit may be closed at such intervals as will designate upon an indicating device the quantity of gasolene within the tank within limits represented by predetermined units. Provision is also made for adapting the actuating means for the circuit closer to different conformations of tanks, so that the accuracy of the device is always maintained within the unit limits irrespective of the size or shape of the tank to which the device is applied.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a longitudinal diametric section of the attachment for automobile gasolene tanks with electric circuits controlled thereby diagrammatically represented. Fig. 2 is a section on the line 2—2 of Fig. 1 but drawn on a larger scale and some parts being shown in elevation. Fig. 3 is a section on the line 3—3 of Fig. 1 and drawn on the same scale as Fig. 2. Fig. 4 is a detail section of a fragment of the flexible member or chain for sustaining the float.

Referring to the drawings, there is shown a portion of a gasolene tank 1 of an automobile, but which showing may, for the reasons already stated, be indicative of any container for any kind of a liquid, whether gasolene or other kind. Applied to the tank or container 1 at any high point, say the top, is a plate 2, indicated as generally circular in outline, but not necessarily of such shape, and this plate has an axially extended flange 3 entering the tank 1 through an opening 4 therein, the plate 2 and tank 1 being united outside the flange 3 in a gas and liquid tight manner.

Formed on the plate 2, if the latter be a casting, or otherwise applied thereto, is a housing 5 having a side extension 6, the housing 5 rising from the plate to a greater extent than the extension 6 in the particular showing of the drawings. Traversing the side walls of the housing 5 is a shaft or rod 7 upon which is mounted a drum 8 having axially spaced side flanges 9 forming between them a circumferential channel 10 designed to receive a flexible structure which may be termed a chain, and in the particular showing of the drawings this chain is composed of blocks 11 of approximately rectangular outline connected together near one side by short links 12, the side or wall of each block where joined to the links 12 being slightly hollowed out, as best indicated at 13 in Fig. 4, so that the chain may travel around the drum 8 and closely hug the same.

The wall of each block 11 remote from the wall 13 is provided with a longitudinal series of pockets or recesses 14, any one or more of which may receive a pin 15 of a length to project an appropriate distance beyond the corresponding face of the block and of a size to snugly fit the recess 14 in which it is lodged.

At one end of the chain there is hung a float 16 preferably by a flexible or joint connection 17 located at about the middle of the float, while at the other end of the chain there is provided a counterweight 18 designed to maintain the chain in a taut condition at all times.

Fast to the inner wall of the flange 3 is a tube 19 preferably, though not necessarily, of circular outline, and adapted to this tube 19 is another tube 20 exterior thereto and snugly fitting the tube 19, but capable of being moved lengthwise thereof, the tube 19 telescoping into the tube 20. At one side the flange 3 is formed with an offset 21, and secured in this offset is one end of a tube 22 which may be of relatively small diameter as compared with the telescoping tubes 19 and 20, and the tube 22 is so located with respect to the drum 8 that that run of the chain carrying the weight 18 extends into the tube 22 and the weight 18 is so related to the tube 22 as to move freely along the latter without any material side play, the tube 22 forming a guide for the weight 18 and the run of the chain carrying such weight.

Since it is customary to make the tubes 19 and 20 cylindrical, though this is not mandatory, these two members will be termed cylinders 19 and 20. When the parts are in place in a gasolene tank, the cylinders 19 and 20 are upright and fast to the lower end of the cylinder 20 is a bottom plate 23 which may be of somewhat greater diameter than the cylinder 20 and is provided with an offset 24 through which the tube 22 is extended. Fast to the outer margin of the plate 23 is an upstanding wall 25 in spaced relation to the cylinder 20 and the tube 22, surrounding both, while this wall 25 has its upper edge 26 bent toward the cylinder 20 and tube 22 until in engagement therewith to form a substantially tight joint. With such a construction the cylinder 20 may be moved lengthwise of the cylinder 19, so that the plate 23 may be brought into contact with the bottom of a gasolene tank in which the device is lodged. When the device is constructed, the tube 22 is long enough to permit the full designed extension of the cylinders 19 and 20, but when the device is installed in any particular gasolene tank the tube 22 is cut off to such a length that with the bottom member 23 resting on the bottom of the tank, the tube 22 need not extend beyond said bottom member, but may be cut off at such a length as to enter this bottom member to steady the lower end of the tube.

The bottom member 23 interior to the cylinder 20 may be somewhat thicker than exterior thereto, and is formed at a distance from the inner wall of the cylinder 20 with a circular groove or channel 27 spaced from the cylinder 20 by approximately the thickness of the cylinder 19. Lodged in the groove 27 is a ring 28 from which upstands a circular series of fingers 29. Fast to the upper end of the cylinder 19 within the same is a ring 30 from which depends a circular series of fingers 31 interspersed with the fingers 29 and forming a substantially snug fit therewith but still free to move lengthwise, that is, the fingers 29 and ring 28 may be moved with the cylinder 20 lengthwise of the cylinder 19 and the fingers 31. These fingers are long enough to provide for the full telescoping travel of the cylinder 20 along the cylinder 19 and also provide a circumferential smooth inner wall for the telescoping members along which the float 16 may travel without finding any shoulders or projections to interfere with its travel, and consequently may fit the interior of the guide made up of the telescoping members 19 and 20 as snugly as need be without producing undue friction, thus preventing any material lateral play of the float or any chance of its becoming lodged at any point.

The cylinder 20 where surrounded by the wall 25 is provided with a circular series of perforations or passages 32 and the wall 25 has a matching series of passages 33. Moreover, the tube 22 may have passages 34 therethrough matching appropriate ones of the passages 32 and 33.

Within the chamber formed between the wall 25 and the cylinder 20 together with the tube 22, there is placed a wrapping 35 of filtering material covering all the passages 32 and the inner passage 34. This wrapping may be of chamois, and surrounding it and holding it in place is a layer 36 of gauze in turn held in place by clamp rings 37. The chamois is useful in connection with gasolene as it will prevent access of water to the interior of the telescoping guide for the float should it transpire that water is introduced into the tank.

When the device is installed in the gasolene tank of an automobile it is also necessary that the chain be of proper length. As the device is manufactured the tube 22 and the chain are of appropriately long length, so as to fit a tank of the largest diameter commonly in use, and when the device is applied to a tank of lesser diameter the part 20 is telescoped on to the part 19 and the tube 22 is cut off to a suitable length, while the chain made up of the blocks 11 is also cut off to a corresponding length, so that with the bottom member 23 engaging the inner bottom wall of the tank and the plate 2 fast to the outer top wall of the tank, the float 16, when there is no gasolene in the tank, may rest upon the bottom 23 with the weight 18 at a suitably high point, and when the float 16 is at a point corresponding to the full level of gasolene within the tank, the weight 18 will not drop below the bottom of the tube 22. Now, if gasolene be poured into the tank, it will pass through the perforations 33 into the chamber inclosed by the wall 25 and from thence through the chamois 35 into the interior of the float guide as defined by the fingers 29 and 31 and the float will be raised in accordance with the amount of gasolene introduced, and if a sufficient quantity be introduced so as to fill the tank to the highest level, the float will rise to its greatest height, while the weight 18 will sink in the tube 22 and the chain made up of the blocks 11 will follow the weight into the tube 22, the direction of movement of the rising run of the chain being changed by passing over the drum 8.

The interior of the housing 5 need not be any larger than sufficient to accommodate the drum 8 and chain made up of the blocks 11. The chamber within the extension 6 and indicated at 38, may be somewhat wider than that within the housing 5 and is preferably divided by an upright wall 39 traversed by a shaft 40 constrained to a predetermined position by a spring 41. Projecting from one side of this shaft toward the housing 5 is an arm 42 in the path of the pins 15 carried by the blocks 11 on the falling run of the chain. Projecting from the shaft 40 opposite the arm 42 is another arm 43 shorter than the arm 42. On opposite sides of the arm 43 and in the path thereof are spring fingers 44, 45, respectively, each carrying a contact terminal 46 in the path of which is another contact terminal 47, one contact terminal 47 being insulated from the other. The spring fingers 44, 45 are both connected to a conductor 48 which may lead to one side of a battery 49 or other suitable source of electric current, while the other side of the battery is connected by a conductor 50 to branch conductors 51 leading to respective solenoids 52, 53, one being connected by a conductor 54 to one of the contacts 47 and the other connected by a conductor 55 to the other contact 47. Each of the solenoids is provided with a core 56 having rack teeth 57 in mesh with a gear pinion 58, which latter is designed to actuate indicating mechanism of suitable character, and which may be the same as that shown and described in application Serial No. 773,722, for indicator for automobile gasolene tanks, filed by me on June 14, 1913.

It is advantageous in an automobile to have the electric circuits where any junctions are made so arranged as to be out of ready access, so that tapering, malicious, or otherwise, may be avoided. For this reason the conductor where joining the conductors 51 may be carried into a junction box 59, while the conductors themselves may be so protected, as by steel armor, as to prevent such tampering.

Assuming that the tank is empty with the float 16 at the bottom of the guide therefor made up of the telescoping members 19 and 20, and the weight 18 at its highest point, then the structure is adjusted on installation for future operation by introducing into the tank a measured quantity of gasolene, say, one gallon. This causes the float 16 to rise for a certain distance and a pin 15 introduced into the appropriate block 11 will engage the arm 42 and rock the shaft 40, so that the arm 43 engages the spring finger 44 moving its contact 46 into engagement with the contact 47 in its path, and as this last named contact is connected by the conductor 54 to the solenoid 52, there is established a circuit from the battery 49 by way of the conductor 50 to the conductor 51, thence through the solenoid 52, and by conductor 54 to the contact 47, contact 46, spring finger 44 and by way of the conductor 48 back to the battery 49. This causes the energization of the solenoid 52 and the indrawing of the core 56, thus causing the rack 57 to rotate the pinion 58 and by means of a suitable arrangement an indication is produced representing the quantity of gasolene measuring one gallon. On the introduction of another gallon of gasolene, a second pin 15 makes engagement with the arm 42 and a second impulse is imparted to the solenoid 52 to move the indicator another distance representing two gallons, and so on until the tank is full or is filled as full as desired, when the indicator will show that the tank contains the number of gallons of gasolene introduced thereinto, or if the tank should already contain some gasolene and the supply be replenished, the indicator will show the total amount of gasolene in the tank.

Suppose, now, that the automobile is run for a distance thereby using the gasolene, the amount of gasolene consumed will be indicated by the engagement of the pins 15 under the arm 42, thus rocking it in the reverse direction, so that the arm 43 engages the finger 45 and the solenoid 53 is energized, whereupon by a suitable arrangement such as described in the aforesaid companion application the indication may represent a diminishing quantity of gasolene, but always showing the total amount of gasolene at any time in the tank. In either case the increasing or decreasing amounts may be shown by steps each representing a definite unit of measurement though not necessarily a gallon.

What is claimed is:—

1. In a device for the purpose described, a float, and a guide therefor comprising two telescoping members in interspersed slidable relation, said guide being of substantially even internal diameter through the range of movement of the float.

2. In a device for the purpose described, a float, means controlled thereby for indicating variations in level of a liquid sustaining the float, and a telescoping guide for the float of substantially even internal diameter throughout the range of movement of the float.

3. In a device for the purpose described, a float, and a guiding chamber therefor composed of two members in telescoping relation, and other members interior to the first-named members and in interspersed slidable relation.

4. In a device for the purpose described, two telescoping members movable one on the other in the direction of their longitudinal axes, one of said members having passages through its walls with a filtering covering, and said members having interior to the telescoping members other telescoping devices provided with interspersed fingers to present a smooth or unobstructed interior passage, and a float lodged in the unobstructed interior passage.

5. In a device for the purpose described, two cylindrical members in telescoping relation, one having a support from which it may depend and the other being related to the pendent member to slide thereon and provided with a closed end remote from the support and with passages through its walls adjacent to the closed end, filtering material traversing the passages, members interior to both telescoping members and of like diameter and provided with oppositely directed interspersed fingers slidable one with relation to the other to present a smooth interior wall free from lateral projections, and a float movable within the space defined by the interspersed fingers.

6. In a device for the purpose described, two cylindrical members in telescoping relation, one having a support from which it may depend and the other being related to the pendent member to slide thereon and provided with a closed end remote from the support and with passages through its walls adjacent to the closed end, filtering material traversing the passages, members interior to both telescoping members and of like diameter and provided with oppositely directed interspersed fingers slidable one with relation to the other to present a smooth interior wall free from lateral projections, and a float movable within the space defined by the interspersed fingers, the second named telescoping member being provided with a protecting perforated wall exterior to the filtering material.

7. In a device for the purpose described, a float, electric circuit controlling means, and a flexible member controlled by the float to rise and fall therewith and constructed to provide for the placing of engaging devices for the circuit controller at different points along the length of the flexible member, at will.

8. In a device for the purpose described, electric circuit controlling means, a float, a chain controlled by the float and composed of a series of flexibly connected blocks and each block provided with a plurality of sockets therein, and pins adapted to any of the sockets in the blocks, the blocks being positioned with relation to the electric circuit controlling means to cause the pins to engage and actuate said circuit controlling means.

9. In a device for the purpose described, electric circuit controlling means, a float, a chain made up of a series of connected blocks and at one end attached to the float, a counterweight at the other end of the chain and movable therewith, direction changing supporting means for the chain, and members carried by the chain for engaging the electric circuit controlling means, the blocks of the chain having each a series of receptacles for the engaging members disposed lengthwise of the block to provide adjustment for the engaging members.

10. In a device for the purpose described, a float, reversely acting circuit controlling means, a chain connected at one end to the float and at the other end carrying a counterweight and made up of a series of connected blocks with sockets therein, and pins adapted to the sockets and of a length to engage the circuit controlling means in either direction of travel of the chains with the float to operate the circuit controlling means in accordance with the direction of travel of the chain.

11. A device for the purpose described comprising a supporting plate with a housing thereon, a drum in the housing, reversely operating circuit controlling means also in the housing, a chain mounted on the drum and composed of a series of pivotally connected blocks each with a longitudinal series of sockets therein, pins adapted to the sockets and movable with the chain into engagement with the circuit controller to operate the latter in accordance with the direction of travel of the chain, a float on one end of the chain, a counterweight on the other end of the chain, and a guiding container for the float carried by the chain and comprising two telescoping members one fast to the plate and the other slidable on the first named member, the second named member having a closure for the end remote from the plate and also having perforations adjacent to said end with filtering material exterior to the perforations, interspersed slidable fingers within the telescoping members and connected to respective members and constituting a smooth inner wall for the reception of the float, and a tube carried by the plate and extending to the bottom of the second-named telescoping member and positioned to receive the counterweight and the run of the chain carrying the counterweight.

12. A device for the purpose described, comprising a supporting plate with a housing thereon, a drum in the housing, reversely operating circuit controlling means also in the housing, a chain mounted on the drum and composed of a series of pivotally connected blocks each with a longitudinal series of sockets therein, pins adapted to the sockets and movable with the chain into engagement with the circuit controller to operate the latter in accordance with the direction of travel of the chain, a float on one end of the chain, a counterweight on the other end of the chain, and a guiding container for the float carried by the plate and comprising two telescoping members one fast to the plate and the other slidable on the first named member, the second named member having a closure for the end remote from the plate and also having perforations adjacent to said end with filtering material exterior to the perforations, interspersed slidable fingers within the telescoping members and connected to respective members and constituting a smooth inner wall for the reception of the float, and a tube carried by the plate and extending to the bottom of the second named telescoping member and positioned to receive the counterweight and the run of the chain carrying the counterweight.

In testimony that I claim the foregoing as my own, I have hereto affixed my signature in the presence of two witnesses.

CLEBURNE EBERHART, Jr.

Witnesses:
JOHN H. SIGGERS,
EDITH L. BROWN.